United States Patent
Duer (10) Patent No.: US 8,291,554 B2
(45) Date of Patent: Oct. 23, 2012

(54) FASTENING ELEMENT FOR TWO-DIMENSIONAL FIBRE MATERIAL AND METHOD FOR FASTENING TWO-DIMENSIONAL FIBRE MATERIAL

(75) Inventor: Hansjoerg Duer, Schwarzach (AT)

(73) Assignee: Sefar AG, Heiden (CH)

(*) Notice: Subject to any disclaimer, the term of this patent is extended or adjusted under 35 U.S.C. 154(b) by 323 days.

(21) Appl. No.: 12/419,802

(22) Filed: Apr. 7, 2009

(65) Prior Publication Data

US 2010/0088864 A1 Apr. 15, 2010

(30) Foreign Application Priority Data

Apr. 7, 2008 (EP) .................................. 08006937

(51) Int. Cl.
*F16B 5/04* (2006.01)
*B01D 25/00* (2006.01)

(52) U.S. Cl. ............ 24/559; 24/16 PB; 24/306; 24/442; 24/452; 24/706.4; 24/710.5; 24/710.8

(58) Field of Classification Search ............... 24/16 PB, 24/306, 442, 452, 559, 706.4, 710.5, 710.8
See application file for complete search history.

(56) References Cited

U.S. PATENT DOCUMENTS

| | | | | | |
|---|---|---|---|---|---|
| 2,780,946 | A | * | 2/1957 | McGuire | ........................ 408/1 R |
| 2,935,434 | A | | 5/1960 | Dawson | |
| 3,192,589 | A | * | 7/1965 | Pearson | ........................ 24/452 |
| 3,471,903 | A | * | 10/1969 | Northrup et al. | ................ 24/306 |
| 3,494,006 | A | * | 2/1970 | Brumlik | ........................... 24/447 |
| 3,905,071 | A | * | 9/1975 | Brumlik | ........................ 24/706.4 |
| 4,367,111 | A | | 1/1983 | Hirose | |
| 4,933,224 | A | * | 6/1990 | Hatch | .......................... 428/100 |
| 5,077,870 | A | * | 1/1992 | Melbye et al. | ................... 24/452 |
| 5,173,997 | A | | 12/1992 | Takezawa et al. | |
| 5,179,767 | A | * | 1/1993 | Allan | .............................. 24/442 |
| 5,640,744 | A | * | 6/1997 | Allan | .............................. 24/442 |
| 5,669,119 | A | * | 9/1997 | Seron | .......................... 24/265 H |
| 5,902,427 | A | * | 5/1999 | Zinke et al. | .................. 156/73.1 |
| 6,112,377 | A | * | 9/2000 | Wilson | ............................ 24/452 |
| 6,351,874 | B1 | * | 3/2002 | Suggs | ....................... 24/265 BC |

(Continued)

FOREIGN PATENT DOCUMENTS

DE 2061064 6/1972

(Continued)

OTHER PUBLICATIONS

Alexander Hoffmann, European Search Report, EP08006937, Sep. 24, 2008.

*Primary Examiner* — Robert J Sandy
*Assistant Examiner* — David Upchurch
(74) *Attorney, Agent, or Firm* — Studebaker & Brackett PC; Donald R. Studebaker (57) ABSTRACT

The invention relates to a fastening element for two-dimensional fiber material comprising a basic element and pin-shaped profile elements, which protrude from the basic element in order to penetrate the fiber material. Provision is made for the profile elements to be deformable in order to form retaining heads for the fiber material. The invention further relates to a method for fastening two-dimensional fiber material which can be carried out with a fastening element of such type. By the method in accordance with the invention a cold micro-riveting can be achieved.

9 Claims, 5 Drawing Sheets

U.S. PATENT DOCUMENTS

| | | | |
|---|---|---|---|
| 6,622,348 B1 * | 9/2003 | Badrenas Buscart | 24/169 |
| 6,656,563 B1 * | 12/2003 | Leach et al. | 428/100 |
| 2003/0135965 A1 * | 7/2003 | Wales | 24/559 |
| 2004/0134039 A1 * | 7/2004 | Tracy | 24/3.4 |
| 2007/0119031 A1 * | 5/2007 | Beltramello | 24/170 |

FOREIGN PATENT DOCUMENTS

| | | |
|---|---|---|
| DE | 3013057 A1 | 10/1981 |
| DE | 3029855 A1 | 3/1982 |
| DE | 3127741 A1 | 2/1983 |
| DE | 4201007 A1 | 7/1992 |
| DE | 4432004 A1 | 3/1996 |
| EP | 0898878 A1 | 3/1999 |
| EP | 1264627 A1 | 12/2002 |
| EP | 1923114 A1 | 5/2008 |
| FR | 2509810 A1 | 1/1983 |
| GB | 1334887 A | 10/1973 |
| GB | 2077342 A | 12/1981 |
| GB | 2134013 A | 8/1984 |

* cited by examiner

FASTENING ELEMENT FOR TWO-DIMENSIONAL FIBRE MATERIAL AND METHOD FOR FASTENING TWO-DIMENSIONAL FIBRE MATERIAL

The invention relates to a fastening element for two-dimensional fibre material in accordance with the preamble of claim 1. A fastening element of such type is designed with a basic element and pin-shaped profile elements, which protrude from the basic element in order to penetrate the fibre material. The invention further relates to a method for fastening two-dimensional fibre material in accordance with the features recited in the claims.

For example in filtration technology textile elements provided for filtration need to be fixed on supports or other retaining devices. For this purpose a device for fastening filter media on devices and apparatuses is known from DE 44 32 004 A1. The device has two profile strips, between which the filter medium is arranged. The profile strips are provided with needles and corresponding holes. On closing the known fastening device the two profile strips are screwed to each other. To this end the needles are pressed through the filter medium so that the filter medium is fixed on the needles. Upon continued compression the needles eventually enter with their tips into the corresponding holes.

Another fastening device for a filter cloth with needles and corresponding holes, wherein the needles are provided for piercing through the filter cloth, is known from EP 1 264 627 A1.

In the post-published European patent application bearing the file number 06 023 832.6 a further multipart holder for a filter medium is described, in which holding mandrels for holding the filter medium are provided, which penetrate the filter medium. This application teaches that the holding mandrels, in addition to the purpose of holding the filter medium, can also be designed for holding together the individual parts of the holder. To this end the holding mandrels can have e.g. at the front face a snap element that forms a snap lock between the basic body of the holder and the holder top.

The object of the invention is to provide a fastening element, in particular a non-metallic fastening element, and a method for fastening two-dimensional fibre material, which can be employed in a great variety of applications and are accompanied by an especially low amount of installation work whilst ensuring a high degree of reliability.

In accordance with the invention the object is solved by a fastening element having the features recited in the claims and by a method having the features recited in the claims. Preferred embodiments are stated in the respective dependent claims.

A fastening element according to the invention is characterized in that the profile elements can be deformed in order to form retaining heads for the fibre material.

A fundamental idea of the invention can be seen in providing on the basic element a plurality of profile elements that are driven through the two-dimensional fibre material to be retained. Directly after or during the driving-through process the profile elements are deformed such that retaining heads are formed on them for the penetrated fibre material. To form the retaining heads the profile elements can be e.g. bent over and/or widened. For best suitability the deformation of the profile elements takes place in the front portions of the profile elements, i.e. in the end portions of the profile elements facing away from the basic element.

Once the pin-shaped profile elements have penetrated the two-dimensional fibre material, the profile elements are surrounded by fibres of the fibre material. As a result of this arrangement the profile elements secure the penetrated two-dimensional fibre material against a lateral movement relative to the basic element. The retaining heads located at the end prevent the fibre material from slipping axially off the profile elements so that a reliable fastening on all sides is provided in an especially simple manner.

The two-dimensional fibre material can be for example a textile material, more particularly a fabric or a fleece. In principle, the fibre material could also be a paper material. By preference, the fibre material is a filter medium, such as for example a filter cloth. The fastening element according to the invention and the method according to the invention serve advantageously for fastening and/or producing a filter.

For an especially easy installation it is suitable for the pin-shaped profile elements to be deformed into the retaining heads by introducing an axially directed force. In such case provision can be made for a counterpart to be placed onto the pin-shaped profile elements and for the retaining heads to be formed by pressing the basic element together with the counterpart.

To form the profile elements into the retaining heads the counterpart can contain corresponding negative shapes that impress their shape onto the profile elements during deformation. However, such corresponding negative shapes are not necessarily required. Experiments have shown that a non-directional deformation of the profile elements is also possible for forming the retaining heads so that the production tools, especially the counterpart, can be kept particularly simple. The counterpart can, in particular, have a planar design at its contact surface on the profile elements.

For an especially easy handling the profile elements can be deformed at a temperature of less than 100° C., in particular less than 50° C., in order to form the retaining heads. Hence, the deformation can preferably be a cold deformation. Advantageously, the profile elements can be deformed at room temperature, in which case a temperature range between 18° C. and 25° C., in particular a temperature range between 19° C. and 21° C. or 22° C. to 24° C. can be understood as room temperature. A cold deformation prevents the fibre material from being deteriorated thermally and thereby permits an especially gentle and therefore reliable fastening.

According to the invention the deformed profile elements can retain the fibre material in a force-locking and/or form-locking manner. However, a material bonded connection between the profile elements and the fibre material for example through gluing or fusion-bonding is conceivable, too. For best suitability, the profile elements with the front portions deformed into the retaining heads constitute the shape of a rivet so that the fastening according to the invention can also be referred to as "cold micro-riveting".

It is especially preferred that at least two profile elements have the same shape, the same dimensions and/or the same material, as this allows for a uniform deformation and therefore a particularly homogeneous introduction of force into the fibre material. By preference, provision is made for a plurality of profile elements, i.e. in particular at least 10.

Basically, a one-sided fastening can be sufficient. However, it is especially preferred that a cover element for placing on the profile elements of the basic element is provided. The cover element, which, in accordance with the invention, can constitute a part of the fastening element, can assume several tasks. On the one hand it can cover the fastening point and protect it against harmful environmental influences so that the reliability and tightness of the fastening is increased further. Additionally or alternatively the cover element can also be provided for the deformation of the profile elements in order to form the retaining heads. In this case the cover element constitutes the aforementioned counterpart. In this embodiment an especially easy installation of the fastening element can be provided, since there is no need for additional tools for the deformation of the profile elements.

Advantageously, the basic element and/or the cover element have a plate-shaped design. In the portion of the profile elements, i.e. in the portion on which the fibre material is arranged, the basic element and/or the cover element preferably have a planar design for an easy installation. But in principle, the basic element and/or the cover element can also have an arched and/or angular design in the portion of the profile elements. It is useful for the basic element and the cover element to have a corresponding shape in the portion of the profile elements.

If a cover element is provided, it is of advantage in accordance with the invention that pin-shaped profile elements also protrude from the cover element in order to penetrate the fibre material. According to this embodiment the introduction of force into the fibre material can take place on both the basic element and the cover element. In such a bilateral fastening the fibre material is retained in a particularly reliable manner. In accordance with the invention the basic element and the cover element are arranged on the fibre material in such a manner that the profile elements of the basic element are displaced laterally to the profile elements of the cover element, in which case a lateral displacement is understood in particular as a displacement in the transverse direction to the longitudinal axis of the profile elements.

Moreover, it is especially preferred that the profile elements of the cover element can also be deformed in order to form retaining heads for the fibre material. As a result, a mutual riveting of the fibre material with the fastening element can be brought about, in which profile elements deformed in a rivet-like manner protrude into the fibre material from both opposite lying plane sides of the fibre material and/or in which the profile elements engage into one another in the shape of an inter-digitated structure. Such a mutual riveting permits on the one hand a particularly resilient fastening of the fibre material. In addition, such a mutual riveting also provides in a particularly easy manner a connection between the basic element and the cover element so that additional retaining means for connecting basic element and cover element can be dispensed with. For best suitability the deformation of the profile elements of the cover element also takes place in the front portions of the profile elements, i.e. in the end portions of the profile elements facing away from the cover element.

As far as their function and/or design is concerned the profile elements of the cover element are preferably designed in analogy to the profile elements of the basic element. It is especially preferred that the profile elements of the basic element have at least in part the same shape, the same dimensions and/or the same material as the profile elements of the cover element, as this permits analogous deformation behaviour and consequently an especially homogeneous introduction of force into the fibre material. More particularly, it is of advantage that the profile elements of the basic element have the same length as the profile elements of the cover element so that their deformation takes place simultaneously.

According to the invention the profile elements form a pin-like structure on the basic element and, if applicable, also on the cover element. It is useful for the profile elements on the cover element and/or on the basic element to be arranged in the form of a regular pattern. For example they can be arranged in the form of one or several rows and/or in the form of a rectangular, in particular square grid. The total number of the profile elements and/or their surface density on the basic element and on the cover element can be equal or can also be different.

It is of particular advantage that the profile elements can be deformed into the retaining heads by pressing the basic element together with the cover element, in particular at room temperature. According to this embodiment the profile elements can be deformed into the retaining heads through axial forces, i.e. forces directed longitudinally of the profile elements, in which case the axial forces act between cover element and basic element. By preference, a temporary pressing can be sufficient. For instance provision can be made for the profile elements to be deformed by applying a strike, such as the blow of a hammer that acts upon the basic element or the cover element.

It is especially advantageous that the basic element and the cover element are designed integrally, which allows for an especially cost-effective production of the fastening element. Likewise, it is especially advantageous that the profile elements of the cover element are designed integrally with the cover element and/or that the profile elements of the basic element are designed integrally with the basic element, which proves to be equally favourable with regard to the production costs.

Moreover, as far as the production work involved is concerned, it is of advantage that the cover element, the basic element and/or the profile elements of the cover element and/or of the basic element contain a plastic material. Said plastic material is suitably a thermoplastic material, which permits a selective melting and/or fusion-bonding of the cover element, the basic element and/or the profile elements for further reinforcement of the fastening. The plastic material can contain for example polyamide, polypropylene, polyethylene or polyethyleneterephthalate, reinforced or non-reinforced. The fastening element can in particular be an injection-molded part.

Another preferred embodiment of the invention resides in the fact that retaining means for fixing the cover element on the basic element are provided. These retaining means in particular render it possible for the cover element to be fixed on the basic element after penetration of the profile elements into the fibre material, and preferably after deformation of the profile elements. In this way a reliable positioning of the cover element on the fastening point is rendered possible. In addition, the profile elements can be relieved. For best suitability the retaining means are dimensioned such that they secure the cover element during the pressing-together of the basic element with the cover element to form the retaining heads.

It is particularly preferred that the retaining means have at least one hook element which is arranged on the basic element and/or on the cover element. A fastening with such hook elements can be integrated in an especially easy way into the production process. In particular, at least a first hook element can be provided on the basic element and at least a corresponding second hook element can be provided on the cover element. The at least one hook element is preferably designed to penetrate the fibre material during the pressing-together of the basic element with the cover element. Especially for this purpose the at least one hook element can be designed by tapering to a point. By preference, the at least one hook element is arranged laterally next to the profile elements on the basic element or respectively on the cover element, and in particular on the same surface as the profile elements.

Additionally or alternatively the retaining means can also have connecting profiles, e.g. pins, which protrude from the basic element and/or the cover element and by means of which a material bonded connection, especially a welded connection, can be established between the basic element and the cover element. The retaining means can also have at least one rivet that penetrates the cover element and/or the basic element in the fixed condition. The retaining means can also have external clamps that embrace the cover element and the basic element.

Furthermore, the retaining means can have at least one snap bolt, which protrudes from the cover element or the basic element and can be guided through a corresponding recess on the basic element or respectively on the cover element, in which case the snap bolt, when guided through the corresponding opening, is compressed at its end and, after having passed through, snaps open again to establish the connection. The retaining means can also have embracing snap elements that fix the cover element and/or the basic element on their edges on the basic element or on the cover element, respectively.

In accordance with the invention it is especially advantageous that the basic element and the cover element can be connected to each other, in particular welded and/or glued, via the profile elements. According to this embodiment the profile elements have a double function by which they both retain the fibre material on the fastening element and retain the basic element and the cover element on each other. In this embodiment retaining means are formed on the profile elements, with the retaining means being preferably formed through a material bonded connection. The welding can take place for example through ultrasonic welding, friction welding or induction welding. For induction welding the profile elements advantageously have a conductive additive.

In addition, it is particularly preferred according to the invention that at least one connecting device is provided, with which the basic element and the cover element are connected in a movable manner relative to each other. By means of such a connecting device it can be ensured that the basic element and the cover element are always present in pairs before the fastening is established. For example the connecting device can have a flexible element, such as a tape, preferably made of plastic.

It is especially advantageous for the connecting device to have a hinge. A hinge can ensure in a very simple way that the basic element and the cover element with the profile elements assume a predetermined relative position during the installation of the fastening element on the fibre material. More particularly, in this embodiment the basic element and the cover element can be swivelled by means of the hinge to such an extent that the profile elements pierce the two-dimensional fibre material and are deformed at their head ends into the retaining heads. With regard to the production work involved it is especially advantageous for the hinge to be a film hinge. A film hinge can be understood as a thin-walled connection, in particular in the form of a fold that permits through its flexibility a rotating movement of the connected elements.

In principle, provision can be made for the pin-shaped profile elements to always have the same cross-section across their entire height. For instance the profile elements can have a cylindrical design. However, it is particularly advantageous for the profile elements to be designed at least in portions by tapering to a point, whereby an especially easy and gentle penetration into the fibre material and displacement of the fibre material is rendered possible. A tapered arrangement is understood in such a way that the profile elements narrow towards their front portions. Provision can be made for a cross-sectional diameter of the profile elements to be smaller than the mesh width of the fibre material or to have at least the same size as the mesh width of the fibre material. As a result, excessive stress of the filter material can be prevented when the connection is established. In particular, when the profile elements displace and/or move the fibre material, for example due to their tapered shape, the profile elements can also be designed with a larger cross-section. For example the profile elements can have a height of approximately 0.5 to 5 mm, preferably approximately 0.8 to 2 mm, in particular approximately 1 mm or 1.6 mm, and a diameter of approximately 0.05 to 2 mm, preferably approximately 0.1 to 1.2 mm, in particular approximately 0.65 mm or 1 mm. By preference, the profile elements are designed inflexible and stiff compared to the fibre material so that a change in stiffness is present on the transition of fibre material—profile element—fibre material.

The reliability of the connection can be enhanced by the fact that the retaining heads are formed through a widening of the profile elements. Basically, a simple bending-over of the profile elements can be sufficient.

The fastening element according to the invention can serve to fix the fibre material on another component, as for example on a border-reinforcing element. In such case provision can be made for the profile elements to penetrate only a section, in particular a border section, of the fibre material. However, by means of the fastening element it is also possible to connect fibre material with fibre material. A preferred embodiment of the invention therefore resides in the fact that the profile elements penetrate at least two sections, in particular border sections, of the fibre material. Depending on the application the sections can be formed at different strips of the fibre material or also on one and the same strip, wherein in the latter case hose-like structures can be formed from the fibre material by means of the fastening element. For example by means of a fastening element according to the invention two opposite lying border sections of a filter medium can be connected to each other so that a filter hose or filter star is produced.

If the profile elements penetrate several sections of the fibre material, these sections can be arranged next to one another so that each individual profile element only penetrates one section at a time. In this case the profile elements can be designed comparatively short. However, to achieve e.g. an especially tight connection the sections of the fibre material can also be arranged on top of each other so that at least some of the profile elements penetrate several sections and the retaining heads of these profile elements each secure several sections at a time.

The fastening element according to the invention can be used for a variety of applications, especially in filtration technology. For instance it can serve to connect a two-dimensional fibre material with a closure, to connect a filter textile with a barrel neck, to connect a securing ring with a centrifuge bag and/or for border reinforcement. The fastening element can also be arranged on a belt filter and form there a protruding convey- or strip. Furthermore, it can serve to connect the two ends of a belt filter with each other. As already set out, a fastening element can also be employed to produce a filter star or a hose filter. Such filter stars can be used for example as oil filters, especially for a vehicle gear transmission. Another application can be in the field of blood filters.

The invention also comprises a method for fastening two-dimensional fibre material, in which a fastening element having a basic element is provided, from which preferably pin-shaped profile elements protrude, in which the fibre material is placed onto the profile elements, the profile elements are driven through the fibre material and the profile elements are deformed and in doing so retaining heads for the fibre material are formed. For best suitability the fastening element used in the method according to the invention is a fastening element in accordance with the invention.

The aspects of the invention described in conjunction with the fastening element can also be used in the method according to the invention, just as the aspects described in conjunction with the method according to the invention can be relevant for the fastening element according to the invention.

The driving-through and deformation of the profile elements preferably takes place in one and the same working step, for example through impact pressing-on of a counterpart. When the profile elements are driven through a shifting or displacement of individual threads of the textile material can occur.

In some cases, provision can also be made for the profile elements to be shot through the two-dimensional fibre material, i.e. they are introduced at such a high speed that the fibre material reacts to the strain in a stiff and brittle manner so that a local interruption of individual threads of the fibre material occurs. In this way a possible corrugation of the fibre material can be counteracted. In principle, it is also possible to provide corresponding recesses in the fibre material before driving the profile elements through. For this purpose a symmetrical or asymmetrical needle can be introduced beforehand that widens the structures of the fibre material, in particular the fabric meshes. It is also possible to prise open the fabric openings and thereby widen them. Moreover, recesses can be produced beforehand through punching, removal of individual threads and/or through laser drilling.

In addition, it is especially advantageous that a cover element is placed onto the fibre material and that the cover element is pressed together with the basic element preferably at room temperature, whereby the profile elements are driven through the fibre material and/or the profile elements are deformed into the retaining heads. According to this embodiment there is no need for an additional counterpart in order to fasten the fibre material, since its function is taken over by the cover element.

A further preferred embodiment resides in the fact that preferably pin-shaped profile elements also protrude from the cover element and that during the pressing-together of the cover element with the basic element the profile elements of the cover element are also driven through fibre material and/or deformed into retaining heads. According to this embodiment a mutual riveting is achieved based both on the basic element and the cover element, in which case the riveting secures the fibre material on the one hand and on the other hand also connects the cover element with the basic element.

To further enhance the reliability of the fastening provision can be made for the basic element to be connected in a material bonded manner, preferably welded, with the cover element on the retaining heads. More particularly, ultrasonic welding can be provided. However, inductive welding is conceivable, too, for which purpose the profile elements can e.g. contain a conductive additive.

In the following the invention will be described in greater detail by way of preferred embodiments, which are shown schematically in the accompanying drawings, wherein.

Elements having the same or a similar effect are designated in all Figures with the same reference signs.

Figure 1:
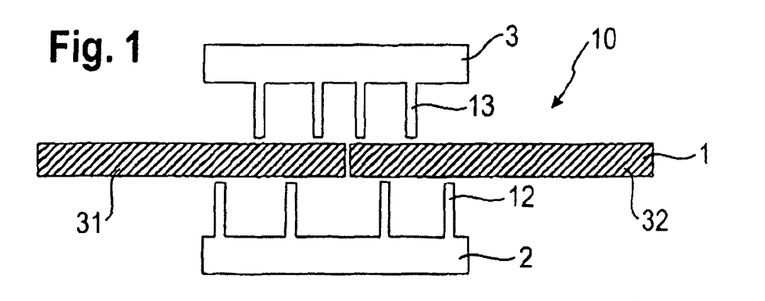
FIGS. 1 to 3 show a first embodiment of a fastening element according to the invention in different method stages during fastening on a two-dimensional fibre material in sectional view.
Figure 2:
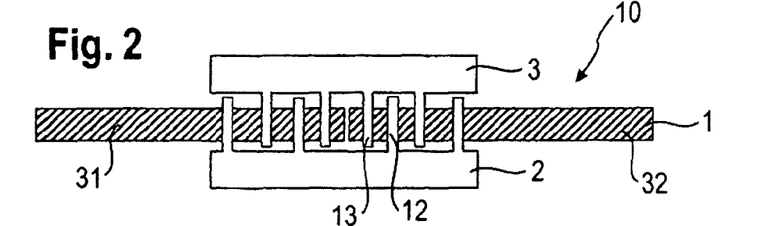
Figure 3:
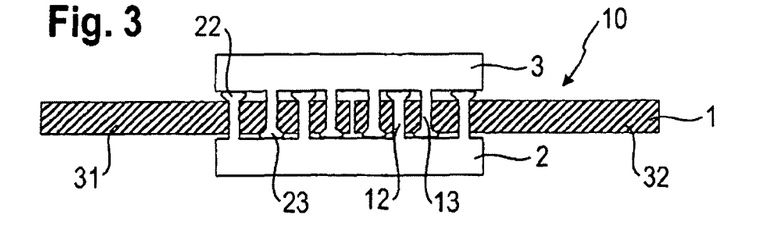

A first embodiment of a fastening element 10 according to the invention in different method stages of fastening is shown in FIGS. 1 to 3. The fastening element 10 has a plate-shaped basic element 2, from which parallel extending, pin-shaped profile elements 12 protrude at a right angle on a preferably rectangular plane side. The fastening element 10 furthermore has a cover element 3, from which parallel extending, pin-shaped profile elements 13 also protrude at a right angle on a preferably rectangular plane side. The profile elements 12 are formed integrally with the basic element 2. Likewise, the profile elements 13 are also formed integrally with the cover element 3. Basic element 2, cover element 3 as well as the profile elements 12 and 13 suitably consist of a thermoplastic synthetic material.

By preference, the plane sides of the elements 2, 3, on which the profile elements 12, 13 are arranged, are of the same size. The profile elements 12 of the basic element 2 have the same length as the profile elements 13 of the cover element 3 and, in particular, they also have the same shape. In the illustrated embodiment the profile elements 12, 13 are designed cylindrically.

The installation of the fastening element 10 on a two-dimensional fibre material 1 in a method according to the invention is explained in FIGS. 1 to 3. As shown in FIG. 1, initially the basic element 2 is arranged on a plane side of the two-dimensional fibre material 1 and the cover element 3 is arranged on the opposite plane side of the two-dimensional fibre material 1 such that both the profile elements 12 and the profile elements 13 extend parallel to one another and face towards the fibre material 1. The basic element 2 and the cover element 3 are positioned such that the profile elements 12 are displaced laterally to the profile elements 13 and during the pressing-together of basic element 2 and cover element 3 they can interlock.

As shown in FIG. 2 the basic element 2 and the cover element 3 are then pressed together, in which case the pressing can be effected for example by a blow applied onto the cover element 3. In doing so, the profile elements 12 and 13 penetrate the fibre material 1 that lies between the elements 2 and 3 and can be a fabric in particular. When the profile elements 12 and 13 penetrate the two-dimensional fibre material 1 threads, especially warp and weft threads, of the fibre material 1 can be torn off and give way to the penetrating profile elements 12, 13. Especially in the case of higher penetration speeds the profile elements 12, 13 can also cut through threads of the fibre material 1 during penetration.

In the course of the pressing together process the profile elements 12 of the basic element 2 come into contact on their front faces, i.e. at their ends facing away from the basic element 2, with the cover element 3. At the same time the profile elements 13 of the cover element 3 come into contact on their front faces, i.e. on the sides facing away from the cover element 3, with the basic element 2. Hence, upon further pressing together a deformation of the profile elements 12 and 13 takes place in their front portions, as illustrated in FIG. 3. As a result, in the head portions of the profile elements 12 and 13 retaining heads 22 and respectively 23 are developed. As shown in FIG. 3, the retaining heads 22 and 23 can be formed through a widening. However, a simple bending of the profile elements 12 or 13 respectively can in principle be sufficient, too.

The profile elements 12, 13 secure the penetrated two-dimensional fibre material 1 in a form-locking manner against a lateral movement. Through the retaining heads 22, 23 micro-rivets are formed that secure the fibre material 1 against an axial slipping from the profile elements 12, 13. In addition, the profile elements 12 and 13 penetrating from opposite sides form with their retaining heads 22 or 23 respectively, a mutual hooking into each other that keeps the cover element 3 together with the basic element 2 through the fibre material 1.

For a further improvement of the fastening provision can be made for the basic element 2 and the cover element 3 to be welded to each other on the retaining heads 22 and/or 23. To further increase the retaining forces it can also be intended that after penetration into the fibre material 1 the profile elements 12 and/or 13 are melted, for example in an inductive way or through ultrasonic effect, in the portion of the penetrated fibre material 1. In particular, the melting can be carried out such that afterwards the threads of the fibre material are encompassed by the melt, whereby an especially good retention of the fibre material is achieved. In principle, provision can also be made for the threads of the fibre material to be fusion-bonded or glued with the profile elements 12, 13 so that a material bonded connection is present.

In the embodiment of FIGS. 1 to 3 the fastening element 10 is used to connect two sections 31 and 32 of the fibre material 1. These two sections 31 and 32 can in particular be border sections of the same textile web or of different textile webs. In the embodiment of FIGS. 1 and 3 the sections 31, 32 to be connected are arranged next to each other in the fastening element 10 so that they overlap neither before nor after the fixation of the fastening element 10. Consequently, each of the profile elements 12 and 13 only penetrates one section at a time, namely either the section 31 or the section 32.

Figure 4:
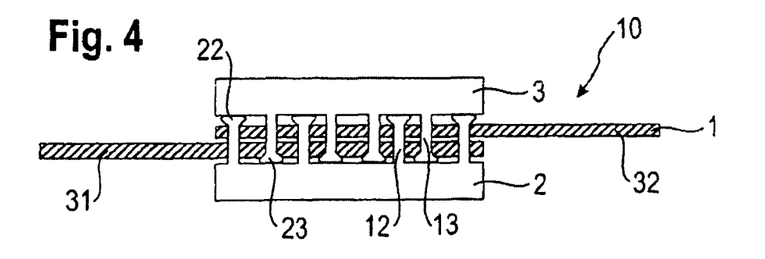
FIG. 4 shows the fastening element of FIGS. 1 to 3 in a different arrangement of the two-dimensional fibre material in sectional view.

In the embodiment of FIG. 4 the fastening element 10 is also used to connect two sections 31 and 32 of the fibre material 1. However, in the embodiment of FIG. 4 the sections 31 and 32 are arranged on top of each other in the fastening element 10 so that they overlap at least in portions. Therefore, at least some of the profile elements 12 or 13 penetrate both sections 31 and 32.

Figure 5:
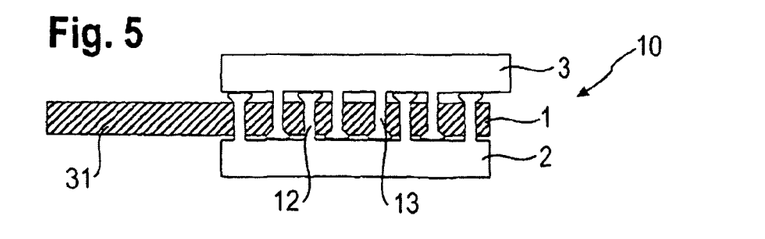
FIG. 5 shows the fastening element of FIGS. 1 to 4 in a different arrangement of the two-dimensional fibre material in sectional view.

In the embodiment of FIG. 5 only one single section 31 of the textile material 1 is fastened on the fastening element 10. In this embodiment the fastening element 10 can be employed for example as border reinforcement for section 31.

Figure 6:
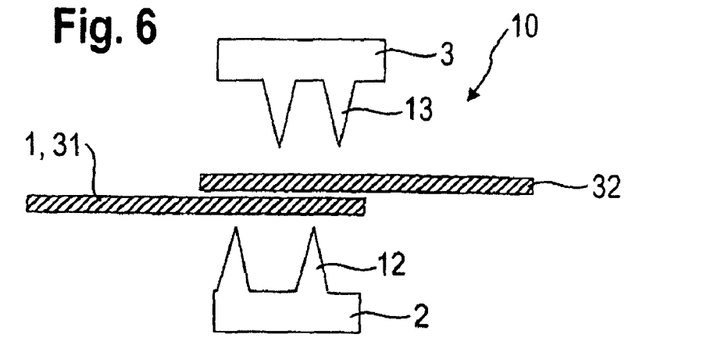
FIGS. 6 and 7 show a further embodiment of a fastening element according to the invention in different method stages during fastening on a two-dimensional fibre material in sectional view.
Figure 7:
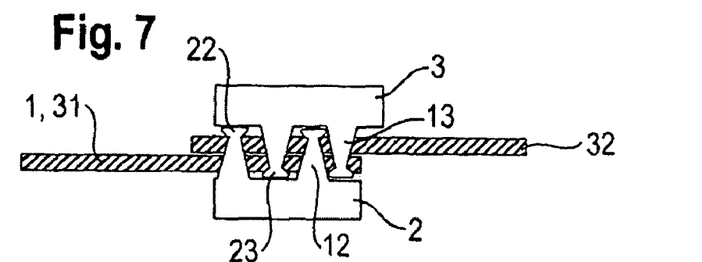

Another embodiment of a fastening element 10 according to the invention is shown before the fastening in FIG. 6 and after the fastening in FIG. 7. In contrast to the embodiments already mentioned, in the embodiment of FIGS. 6 and 7 the profile elements 12 and 13 are not designed cylindrically but taper to a point, i.e. they taper conically towards their front portions.

Figure 8:
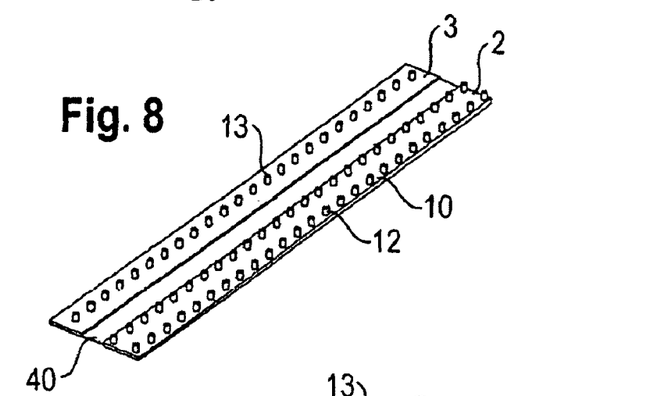
FIG. 8 shows a further embodiment of a fastening element according to the invention in perspective view.

A further embodiment of a fastening element 10 is shown in FIG. 8. In the embodiment of FIG. 8 the cuboid-shaped basic element 2 and the cuboid-shaped cover element 3 are connected to each other by means of an integral hinge 40, which can also be called film hinge or living hinge, that extends along of the long cuboid sides. On the one hand the integral hinge 40 ensures that before installation of the fastening element 10 the basic element 2 and the cover element 3 are always present in pairs. On the other hand the integral hinge 40 ensures that during the installation, i.e. during the bending-over of the fastening element 10 about the integral hinge 40, the profile elements 12 and 13 come to rest in a defined position, in which the profile elements 12 are displaced laterally to the profile elements 13.

In the embodiment of FIG. 8 two parallel extending rows with profile elements 12 are provided on the basic element 2. On the cover element 3 only one single row of profile elements 13 is provided that extends parallel to the two profile element rows of the basic element 2. The profile element rows of cover element 3 and basic element 2 extend parallel to the integral hinge 40 and parallel to the long cuboid side of the elements 2 and/or 3. When bending over the two elements 2 and 3 about the integral hinge 40, in the embodiment of FIG. 8 the profile elements 13 of the cover element 3 come to rest between the two profile element rows of the profile elements 12 of the basic element 2.

Figure 9:
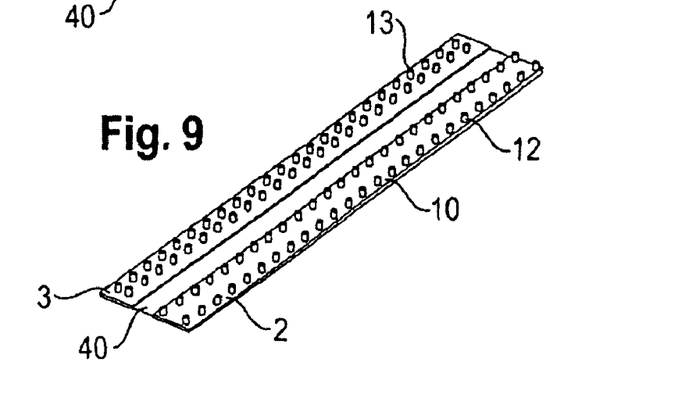
FIG. 9 shows a further embodiment of a fastening element according to the invention in perspective view.

The embodiment of FIG. 9 differs from the embodiment of FIG. 8 in that two parallel extending rows of profile elements 13 are also provided on the cover element 3. When bending over basic element 2 and cover element 3 about the integral hinge 40, both rows of the profile elements 13 of the cover element 3 come to rest between the two rows of the profile elements 12 of the basic element 2.

Figure 10:
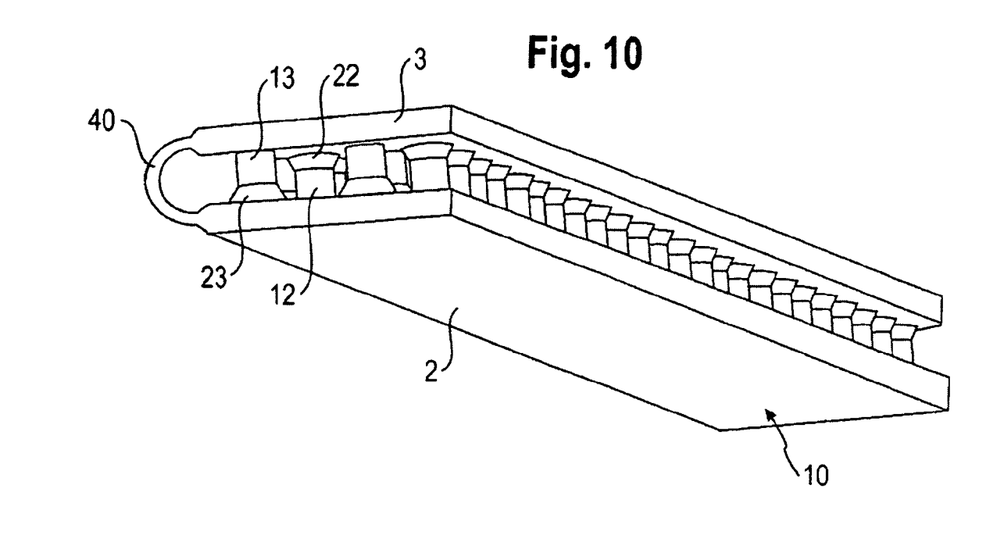
FIG. 10 shows a further embodiment of a fastening element according to the invention in perspective view after installation, in which case the two-dimensional fibre material is not illustrated for the sake of clarity.

FIG. 10 shows a further embodiment of a fastening element 10 according to the invention with an integral hinge 40 in the condition after the bending-over about the integral hinge 40 and deformation of the profile elements 12, 13, in which case the fibre material 1 is not illustrated in FIG. 10 for the sake of clarity. In the embodiment of FIG. 10 two parallel extending rows of profile elements 12 are provided on the cuboid-shaped basic element 2 and two parallel extending rows of profile elements 13 are likewise provided on the cuboid-shaped cover element 3, wherein in the case of the embodiment of FIG. 10 the rows of the profile elements 12 are arranged in an alternating manner with the rows of the profile elements 13 when the fastening element 10 is installed.

Figure 11:
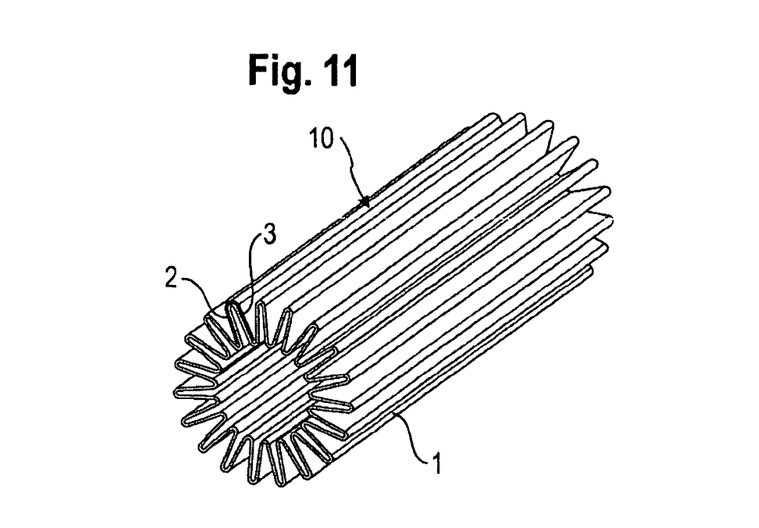
FIG. 11 shows an example of application of a fastening element on a pleated filter star in perspective view.

FIG. 11 shows an application of the fastening element of FIG. 10 for the production of a pleated filter star. In the production the basic element 2 and the cover element 3 are first of all bent partly about the integral hinge 40. Then the two longitudinal border portions of the fibre material 1 of the filter star are positioned between the basic element 2 and the cover element 3. The two-dimensional fibre material 1 can be e.g. a glass fibre fleece that can also have a supporting fabric, especially a plastic supporting fabric. Afterwards, the basic element 2 and the cover element 3 are cold-riveted with each other by being pressed together. In doing so, the border portions of the fibre material 1 are connected and the filter star is closed longitudinally. Optionally, an additional fixing of basic element 2 and cover element 3 through welding, especially ultrasonic welding, can subsequently be provided. The pleated filter stars produced in this way can be employed for example as by-pass oil filter, in particular for oil filter cartridges.

The embodiments of FIGS. 12 to 17 substantially correspond to the embodiments of FIGS. 1 to 5, wherein according to FIGS. 12 to 17 additional retaining means are provided for fixing the cover element 3 on the basic element 2 in the installed condition of the fastening element 10.

Figure 12:
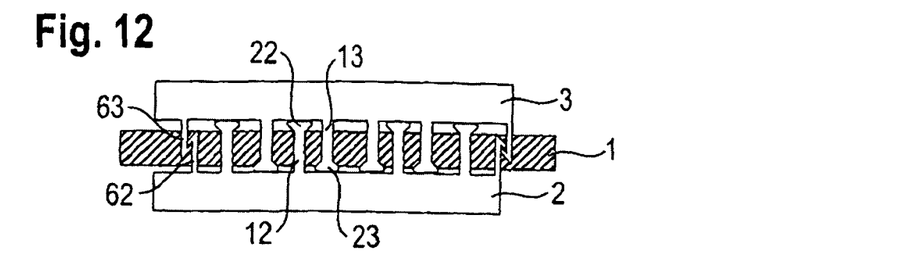
FIGS. 12 to 18 each show a further embodiment of a fastening element according to the invention in sectional view.

In the embodiment of FIG. 12 mutually corresponding hook elements 62 and 63 respectively are provided on the basic element 2 and on the cover element 3, which protrude next to the profile elements 22 or 23, respectively, at a right angle from the basic element 2 and from the cover element 3 respectively and which preferably penetrate the fibre material 1 in the installed condition. To this end the hook elements 62, 63 have the shape of a tapered barb that permits a penetration through the threads of the fibre material 1. Advantageously, the dimensions of the hook elements 62, 63 are of the same size as that of the profile elements 12, 13.

Figure 13:
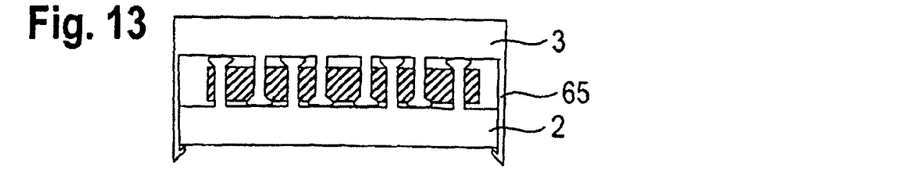

In the embodiment of FIG. 13 an embracing snap connection is provided, in which snap elements 65 located on the cover element 3 embrace the opposite lying basic element 2, i.e. they retain the basic element 2 at its border edges. Additionally or alternatively, such embracing snap elements can also be provided on the basic element 2 and in this case they embrace the cover element 3.

Figure 14:
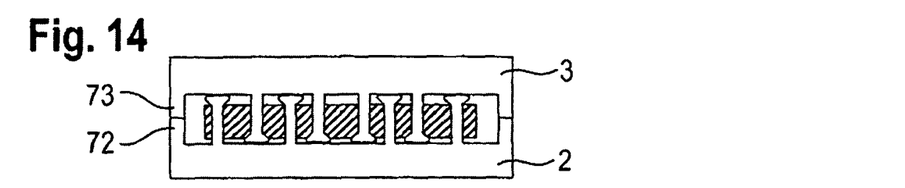

In the embodiment of FIG. 14 the basic element 2 and the cover element 3 are connected to each other in a material bonded manner by means of additional connecting profiles provided on the basic element 2 and/or the cover element 3. In the illustrated embodiment these connecting profiles are formed by pins 72 and 73 that protrude from the basic element 2 and from the cover element 3 respectively. The pins 72 and 73 are welded to each other. As an alternative or in addition to a welding a gluing can be provided, too.

Figure 15:
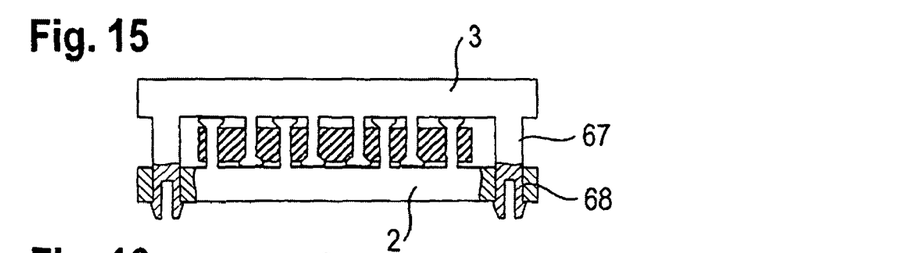

In the embodiment of FIG. 15 snap pins 67 are provided on the cover element 3, which protrude through recesses 68 on the basic element 2. Alternatively or additionally snap pins can be provided on the basic element 2 and corresponding recesses on the cover element 3. The snap pins 67 have a flexible head that deforms when being introduced into the recess 68 and in this way permits the passage through the recess 68. After having passed through, the barbed-like head regains its original shape, in which it blocks a subsequent pulling-out of the snap pin 67.

Figure 16:
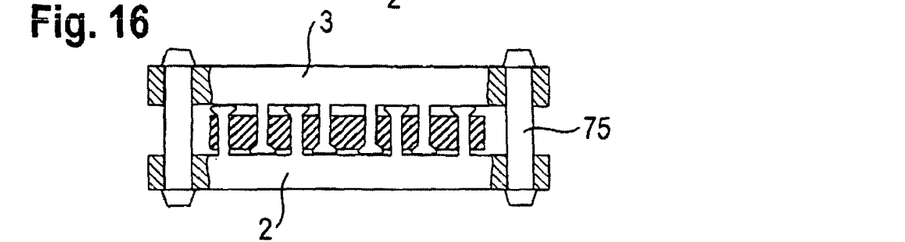

In the embodiment of FIG. 16 the basic element 2 and the cover element 3 are connected to each other by rivets 75.

Figure 17:
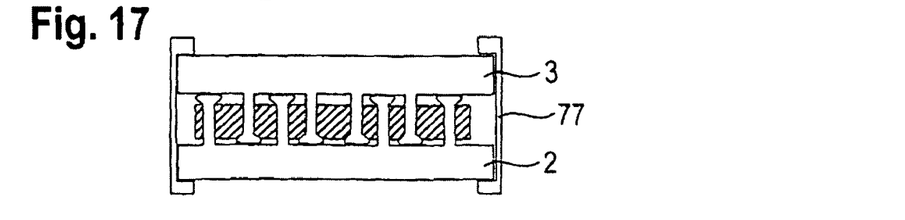

In the embodiment of FIG. 17 external U-shaped clamps 77 are provided, which embrace the basic element 2 and the cover element 3 on the border-side and connect them to each other.

Figure 18:
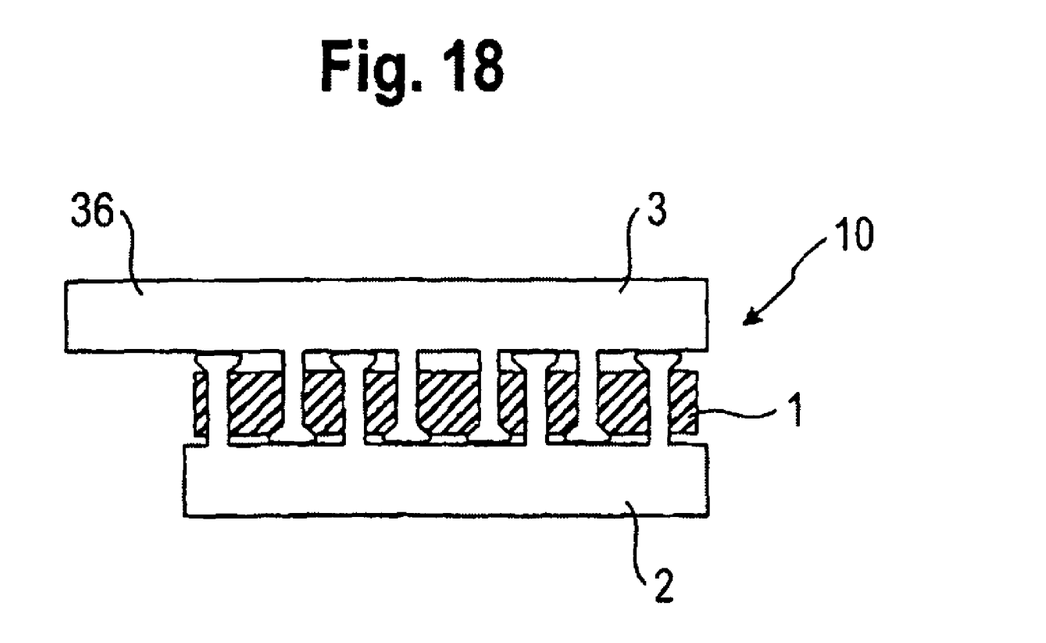

The embodiment of FIG. 18 also corresponds substantially to the embodiments of FIGS. 1 to 5. In accordance with FIG. 18, in the installed condition of the fastening element 10, the cover element 3 has a projecting length 36 with regard to the basic element 2 so that it can preferably serve as a tying strip. To form the projecting length 36 the cover element 3 is preferably of a slightly greater length than the basic element 2. As shown in FIG. 18, the projecting length can be provided on the left side but also on the right side or on both sides.

The invention claimed is:

1. A fastening element, having a basic element, for riveting a two-dimensional fibre material to the basic element, comprising:

pin-shaped profile elements protruding from the basic element, each of the pin-shaped profile elements being adapted to penetrate through the fibre material, each of the pin-shaped profile elements of the basic element includes a head portion, each head portion is protruded out of the fiber material, and a cover element being adapted to place on and to press against the head portion of the pin-shaped profile elements of the basic element after penetration of the pin-shaped profile elements through the fibre material to cause the head portions of the pin-shaped profile elements of the basic element to deform, wherein the head portions of the pin-shaped profile elements of the basic element are deformed by the cover element upon pressured contact with the cover element, wherein the deformed head portions are widened into retaining heads and rivets are formed, as the basic element and the cover element are pressed together, and after the retaining heads are formed, the retaining heads are directly attached to an inner side of the cover element facing the basic element, and the retaining heads are located between the cover element and the fibre material, and wherein the two-dimensional fibre material being arranged and fastened in a form-locking manner between the basic element and the widened retaining heads.

2. Fastening element according to claim 1, wherein the cover element includes pin-shaped profile elements protruding from the cover element to penetrate the fibre material, wherein each of the profile elements of the cover element includes a head portion to be deformed upon pressured contact with the basic element to form retaining heads for the fibre material.

3. Fastening element according to claim 1, wherein the profile elements are deformed into the retaining heads by pressing the basic element together with the cover element at room temperature.

4. Fastening element according to claim 1, wherein the cover element and the basic element are integrally attached, and the cover element, the basic element and/or the profile elements contain a plastic material.

5. Fastening element according to claim 1 further comprises a retainer to fix the cover element on the basic element, the retainer having at least one hook element arranged on the basic element and/or on the cover element.

6. Fastening element according to claim 1, wherein the basic element and the cover element are connectable to each other by being welded to each other by means of the profile elements.

7. Fastening element according to claim 1 further comprises at least one connecting device, with which the basic element and the cover element are connected in a movable manner relative to each other, and the connecting device has a hinge integral with the basic element and the cover element.

8. Fastening element according to claim 1, wherein the profile elements are at least in portions by tapering to a point, and the retaining heads are formed through a widening of the profile elements.

9. Fastening element according to claim 1, wherein the profile elements penetrate at least two separate sections of the fibre material, the sections being arranged next to or on top of each other.

* * * * *